UNITED STATES PATENT OFFICE.

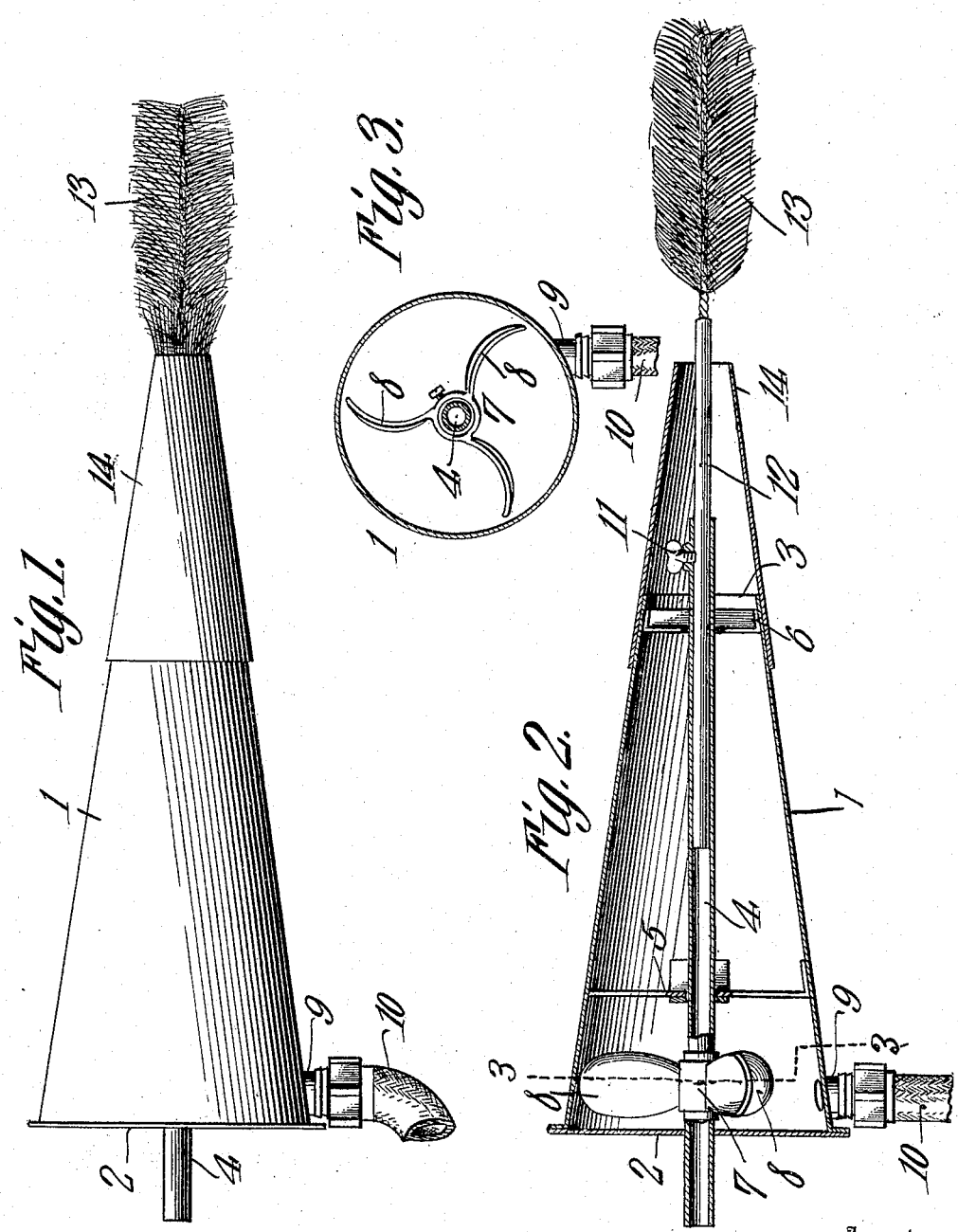

ISAAC DUPUIS, OF VANCOUVER, BRITISH COLUMBIA, CANADA.

BOTTLE-WASHER.

No. 901,160.　　　Specification of Letters Patent.　　　Patented Oct. 13, 1908.

Application filed February 18, 1908. Serial No. 416,580.

*To all whom it may concern:*

Be it known that I, ISAAC DUPUIS, a subject of the King of England, residing at Vancouver, in the Province of British Columbia and Dominion of Canada, have invented a new and useful Bottle-Washer, of which the following is a specification.

This invention relates to a bottle washer and has for its object to provide a conical casing in the axis of which is journaled a telescopic shaft having on one end within the casing and near its base a water wheel and on its opposite end exterior to the casing a brush of suitable shape to insert into bottles for the purpose of cleaning them. A water pipe is connected to the casing at its base through which water is conveyed to impinge tangentially against the water wheel for the purpose of rotating the shaft. The smaller end of the casing is made removable, so that access may be had to the shaft for the purpose of lengthening or shortening the same.

In the accompanying drawings:—Figure 1 is a side view of the improved bottle washer. Fig. 2 is a longitudinal vertical section of the same. Fig. 3 is a transverse section on the line 3—3 of Fig. 2.

Corresponding parts in the several figures are indicated throughout by similar characters of reference.

The numeral 1 designates a conical casing closed at its base by a plate 2 and open at its truncated end 3. Centrally disposed within the casing is a hollow shaft 4 supported on bearings 5 and 6 attached to the walls of said casing. Near the base of the casing is a water wheel 7 having, in this instance, three arms 8 secured to a hub fixed to the shaft 4 and rotated by a stream of water passing into the casing through a pipe 9 striking said arms. The pipe 9 is connected to a pipe 10 leading from a source of supply. The hollow shaft 4 projects a short distance beyond the mouth 3 of the casing and is provided with a thumb screw 11 for securing the rod 12 adjustably within the shaft, said rod having on its outer end a brush or other form of washing device 13. By loosening this thumb nut, the rod 12 may be extended to reach the bottom of the largest bottles to be washed. The open end 3 of the casing is provided with a conical tube or nozzle 14 arranged to slip over the end of the casing and be retained thereon by frictional contact, the smaller end of the nozzle serving as an outlet for the water used for turning the wheel 7.

In operation, the device should be preferably held in a horizontal position as represented in the drawing and the brush adjusted to suit the size of the bottles to be washed. If, now, the water be turned on, it will pass through the pipe 9 into the casing 1 and, striking the arms of the water wheel, will set up a rapid rotation of the shaft and brush, the waste water passing out through the nozzle 14 into the bottle and on the brush.

What is claimed is:—

1. A bottle washer comprising a conical casing, an axial shaft rotatably mounted therein, a water wheel affixed to said shaft near the base of said conical casing, an inlet tube for conveying water to said wheel, a rod adjustably mounted in said shaft, means to secure said rod in adjusted relation within said shaft, a brush on the outer end of said rod, and a conical nozzle fitted tightly but removably on the open end of said casing to conduct the waste water to the bottle to be cleaned.

2. A bottle washer comprising a conical casing having a flat closed base and open at the frustum end, a hollow shaft axially disposed within the said casing and projecting from its open end, a water wheel fixed to said shaft near the base of the casing, a tube for conveying water to said casing, and arranged to strike tangentially against the arms of said water wheel, a rod adjustably mounted in said shaft and having a cleaner on one end adapted to enter the mouth of the bottle to be cleaned, and a conical nozzle fitted tightly but removably on the open end of said casing to conduct the waste water to the bottle to be cleaned.

3. In a device of the kind described, a frusto-conical casing having an opening in the small end, a shaft composed of two parts adjustably mounted one within the other, a set screw held in the outer part and adapted to press against the inner part and lock said part in the desired relation, said shaft projecting from the smaller end of said casing, and of less diameter than the opening, a brush carried on the projecting part of said shaft, means to rotate the shaft and brush, and a conical nozzle fitted tightly but removably on the open end of said casing to conduct the waste water to the bottle to be cleaned.

In testimony that I claim the foregoing as my own, I have hereto affixed my signature in the presence of two witnesses.

ISAAC DUPUIS.

Witnesses:
A. E. GALPIN,
C. J. ROGERS.